UNITED STATES PATENT OFFICE.

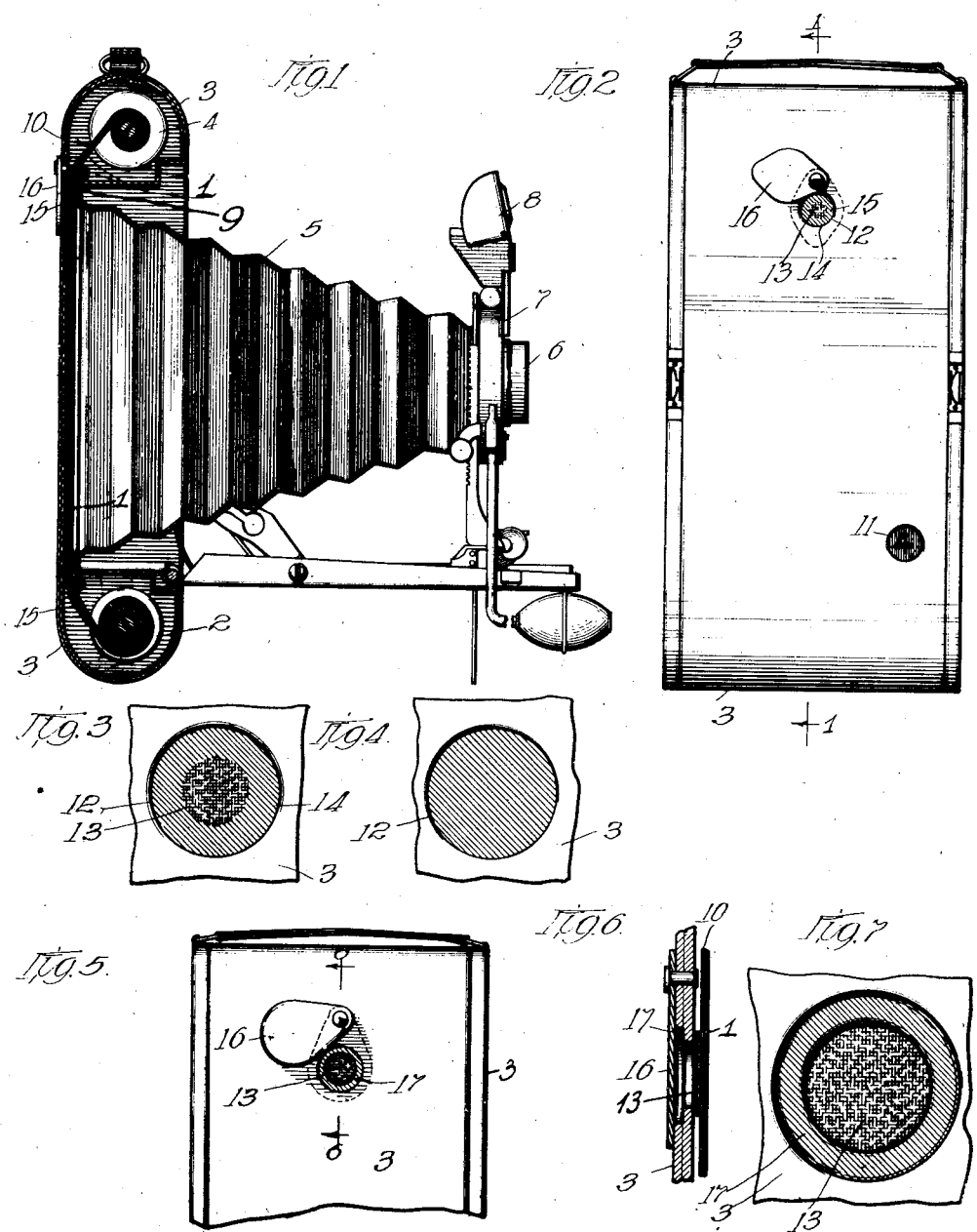

HARRY L. IDE, OF SPRINGFIELD, ILLINOIS.

PHOTOGRAPHIC CAMERA.

1,170,538.  Specification of Letters Patent.  Patented Feb. 8, 1916.

Application filed April 5, 1915. Serial No. 19,113.

*To all whom it may concern:*

Be it known that I, HARRY L. IDE, citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to photographic cameras and has for its general object the provision of an arrangement of sensitized portions for testing the actinic value of light to determine the duration of exposure of the negative elements, there being means whereby a fresh testing element is made available for use in the preparation of the camera for the taking of a fresh picture. There is thus a test portion which is individual to each negative. Each testing portion is of such a nature that its tint will rapidly be changed when exposed to the light. The camera desirably also carries a fixed or standard tint to which the testing element should turn to measure the time or determine the duration of negative exposure in the particular light to which the testing element is subject and in which the picture is to be taken.

The camera desirably includes two openings, through one of which the light is to be admitted there to function in the test operation and through the other of which the negative is to be exposed to such light a period of time which is determined by the test and the size of the opening through which the light is to be admitted to the negative.

The invention is capable of a wide variety of adaptations, the accompanying drawings showing the preferred embodiment thereof as employed in a camera of the folding bellows type, though the invention is not to be limited to any particular form of camera in connection with which it may be employed.

In the drawing Figure 1 is a view of such a camera, equipped with my invention, in vertical elevation, partially in section, on line 1 1 of Fig. 2; Fig. 2 is a rear view of the camera structure showing the preferred form of my invention; Fig. 3 is a detail view illustrating a part of a light shield upon which there is provided a sensitized testing portion surrounded by a portion having a fixed tint to constitute a standard, the changeable tint illustrated in Fig. 3 being that which exists before the testing exposure; Fig. 4 shows the parts illustrated in Fig. 3 after the testing exposure of such duration which will cause the changeable tint upon the testing sensitized element to be the same as the standard tint; Fig. 5 is a view illustrating a modification; Fig. 6 is a view on line 6 6 of Fig. 6; and Fig. 7 is an enlarged view of a part of the structure shown in Fig. 5.

Like parts are indicated by similar characters of reference throughout the different figures.

In the form of the invention illustrated the sensitized elements that are to form the photographic negatives are embodied in a flexible element 1 commonly called a film which is supplied to the user on a supply spool 2 that is removably inserted in the lower end of the camera case 3 and from which supply spool the film is led to the winding spool 4. In the form of camera shown for the purpose of illustrating the invention there is included a bellowslike element 5 which tapers to its forward end at which it is connected with the camera "front" that is provided with the usual camera lens (of which the frame 6 is shown), shutter (of which finger lever 7 is shown) and finder 8, all as is well understood by those familiar with the art. The rear of the bellowslike element 5, as is well known, is attached to the border portion 9 of the casing 3 and defines, with the border portion 9, the extent of the area of the film which is to be exposed to the light in photographic operation.

A so-called film comprises a thin base of sheet celluloid coated upon the side thereof that is to face the lens with a sensitized coating which is to respond to light exposure in the production of photographic negatives. The film is backed by a sheet or tape of paper 10 which is of such a color, say black or has a combination of colors, to prevent the light from striking through the film to the front or sensitized surface thereof. The ribbons or sheets 1 and 10 are wound together upon the supply spool 2 and are wound together from the supply spool upon the winding spool 4, all as is well known by those familiar with the art.

Each film is of such a length as to furnish a number of negatives in the type of camera illustrated, but to which characteristic this invention is not to be limited. The back of the light shielding paper 10 is marked at intervals with numbers (see the numeral 4 in Fig. 2) which numbers are spaced apart longitudinally of the light shield 10 equal distances that are slightly in excess of the lengths of the negatives. These numbers successively appear before a display opening in the back of the camera casing and which display opening is generally covered with a transparent red glass or celluloid 11. In accordance with my invention, each photographic element that is to become a negative (whether a number of such elements are serially related in a single ribbon or film 1 or not) is accompanied by a sensitized testing portion which is preferably supplied in addition to the sensitized surface of the negative film or element in order that the testing portion may be made more rapidly to change its tint when exposed to light, the sensitized surfaces of negative producing elements generally being slow to change in color or tint when exposed. When my invention is embodied in a camera of the type illustrated the sensitized testing portions are preferably provided upon the back of the light shield 10, each sensitized testing portion being desirably included in a disk 12 whose central part 13 is sensitized, this central sensitized part 13 being surrounded by a wide annular border 14 of fixed tint. I have, in practice, employed a sensitized testing portion 13 which is initially a definite shade of yellow and which, in changing its tints, will assume a greenish tint which the border 14 permanently has. Suitable paper (unaccompanied by fixed tint) is found upon the market and is supplied for use in exposure meters furnished by Adams & Co., 24 Charing road, London. The disks 12 having the changeable and fixed tints 13 and 14 are spaced apart longitudinally of the strip of light shielding paper 10 distances similar to the distances between the numerals (of which a numeral 4 is shown in Fig. 2) that define the different negative forming sections of the film. That is, if the film is adapted to produce ten negatives, there will be ten disks 12 spaced apart on the back of the light shielding paper 10 equal distances that correspond to or exceed the lengths of the negatives and which distances are equal to the distances between the designated numerals upon the strip 10. These disks 12 are brought successively into register with an opening 15 (functioning to permit the passage of light in the arrangement illustrated) preferably when the numeral that numbers a new negative area upon the film appears at 11. This opening 15 is desirably normally covered by a light shutter 16 to prevent a premature testing operation. When a fresh unexposed area or section of the film 1 is brought into register with the bore of the bellowslike element 5, a fresh disk 12 with an unexposed testing sensitized surface 13 is (preferably) brought into register with the opening 15. Before the new picture is taken the light shutter 16 is opened to expose the corresponding sensitized area 13 to the light, and when the tint of the area 13 has changed to be the same as that of the border 14 (as indicated in Fig. 4) the time of the picture taking exposure has been determined. The number of seconds or minutes required to bring the tint of the changeable tint sensitized area 13 to be the same as the tint of the border 14 measures the actinic light value and the duration of the picture taking exposure is governed according to this value thus determined in the testing operation and also according to the size of the lens aperture which is selected in the photographic operation, as will be well understood by those familiar with the art, there being devices upon the market which will guide the user in determining the duration of exposure with differing sizes of lens openings after the actinic light value has been determined as herein set forth and the calculating device, if desired, may be mounted upon the camera casing 3 for the sake of convenience. It is customary to wind up the exposed section of the film as soon as a picture is taken to present a new section of film to the camera lens preparatory to taking a new picture. As a result a new testing disk is brought into register with the opening 15 in readiness for a new test previous to taking a new picture, on which account the light shutter 16 should preferably be closed after each test in order that the succeeding sensitized testing element 13 may not be prematurely affected by the light.

The portion 14 of fixed or standard tint is associated with each negative forming element for the sake of convenience but I do not wish to be limited to a fixed collocation of the portions having fixed and changing tints nor do I wish to be limited to the relative arrangement of portions having such tints which I have illustrated. I also do not wish to be limited to the employment of an element having a fixed tint which is incorporated with or carried by the camera structure as it is obvious that a portion having a fixed tint may be carried in the pocket of the user to be compared with a portion of changeable tint 13 in each test operation, in which event the portion 14 having a fixed tint would be absent.

Where it is desired, for the sake of convenience, to carry the standardizing portion having a fixed tint upon a part of the camera, the alternative arrangement illustrated in Figs. 5, 6 and 7 may be employed. In the structure shown by these figures the sensitized portions 13 are not in fixed association with portions, such as 14, of fixed tint, but are successively brought into register with a bordering annular ledge 17 at the opening 15, this ledge being provided with the fixed tint with which the changing tint at 13 is to be compared. This feature is specifically claimed in my co-pending application Serial No. 57,404, filed October 23, 1915.

While I have provided the testing portions 13 at the rear of the negative producing elements in the film 1 and have preferably disposed these test portions upon the light shields embraced in the ribbon 10, I do not wish to be limited to such a disposition of the testing portions with respect to the negative producing elements nor to the position of these testing portions upon the light shields.

Having thus described my invention I claim as new and desire to secure by Letters Patent the following:—

1. A photographic camera including a plurality of negative elements; and sensitized testing portions, each individual to and coupled with a negative element, for testing actinic light value.

2. A photographic camera including a plurality of negative elements; sensitized testing portions, each individual to and coupled with a negative element, for testing actinic light value; and means for arranging the negative elements and the sensitized testing portions individual thereto for exposure.

3. A photographic camera including a plurality of negative elements; sensitized testing portions, each individual to a negative element, for testing actinic light value; and means for simultaneously moving the negative elements and the sensitized testing portions individual thereto to exposure positions.

4. A photographic camera including a plurality of negative elements; light shields for the negative elements individual thereto and movable therewith; and an actinic light value testing portion provided upon each light shield.

5. A photographic camera including a plurality of negative elements; sensitized testing portions, each individual to and coupled with a negative element, for testing actinic light value, there being an exposure opening in the camera casing, distinct from the lens opening, to which the testing portions are brought; and a shutter for normally excluding actinic light from said opening.

6. A photographic camera including a plurality of negative elements; sensitized testing portions, each individual to and coupled with a negative element, for testing actinic light value; means for arranging the negative elements and the sensitized testing portions individual thereto for exposure, there being an exposure opening in the camera casing, distinct from the lens opening, to which the testing portions are brought in succession; and a shutter for normally excluding actinic light from said opening.

7. A photographic camera including a plurality of negative elements; sensitized testing portions, each individual to a negative element, for testing actinic light value; means for simultaneously moving the negative elements and the sensitized testing portions individual thereto to exposure positions, there being an exposure opening in the camera casing, distinct from the lens opening, to which the testing portions are brought in succession; and a shutter for normally excluding actinic light from said opening.

8. A photographic camera including a plurality of negative elements; light shields for the negative elements individual thereto and movable therewith; an actinic light value testing portion provided upon each light shield, there being an exposure opening in the camera casing, distinct from the lens opening, to which the testing portions are brought in succession; and a shutter for normally excluding actinic light from said opening.

9. A photographic camera including a plurality of negative elements; and sensitized testing portions, each individual to and coupled with a negative element, for testing actinic light value and whose tint is modified by the action of actinic light, there being fixed tint upon the camera for comparison with changing tints of exposed testing portions.

10. A photographic camera including a plurality of negative elements; sensitized testing portions, each individual to and coupled with a negative element, for testing actinic light value and whose tint is modified by the action of actinic light, there being fixed tint upon the camera for comparison with changing tints of exposed testing portions; and means for arranging the negative elements and the sensitized testing portions individual thereto for exposure.

11. A photographic camera including a plurality of negative elements; sensitized testing portions, each individual to a negative element, for testing actinic light value and whose tint is modified by the action of actinic light, there being fixed tint upon the camera for comparison with changing tints of exposed testing portions; and means for simultaneously moving the negative elements and the sensitized testing portions individual thereto to exposure positions.

12. A photographic camera including a plurality of negative elements; light shields for the negative elements individual thereto and movable therewith; and an actinic light value testing portion provided upon each light shield, whose tint is modified by the action of actinic light, there being fixed tint upon the camera for comparison with changing tints of exposed testing portions.

13. A photographic camera including a plurality of negative elements; sensitized testing portions, each individual to and coupled with a negative element, for testing actinic light value and whose tint is modified by the action of actinic light, there being fixed tint upon the camera for comparison with changing tints of exposed testing portions, there being an exposure opening in the camera casing, distinct from the lens opening, to which the testing portions are brought; and a shutter for normally excluding actinic light from said opening.

14. A photographic camera including a plurality of negative elements; sensitized testing portions, each individual to and coupled with a negative element, for testing actinic light value and whose tint is modified by the action of actinic light, there being fixed tint upon the camera for comparison with changing tints of exposed testing portions; means for arranging the negative elements and the sensitized testing portions individual thereto for exposure, there being an exposure opening in the camera casing, distinct from the lens opening, to which the testing portions are brought in succession; and a shutter for normally excluding actinic light from said opening.

15. A photographic camera including a plurality of negative elements; sensitized testing portions, each individual to a negative element, for testing actinic light value and whose tint is modified by the action of actinic light, there being fixed tint upon the camera for comparison with changing tints of exposed testing portions; means for simultaneously moving the negative elements and the sensitized testing portions individual thereto to exposure positions, there being an exposure opening in the camera casing, distinct from the lens opening, to which the testing portions are brought in succession; and a shutter for normally excluding actinic light from said opening.

16. A photographic camera including a plurality of negative elements; light shields for the negative elements individual thereto and movable therewith; an actinic light value testing portion provided upon each light shield, whose tint is modified by the action of actinic light, there being fixed tint upon the camera for comparison with changing tints of exposed testing portions, there being an exposure opening in the camera casing, distinct from the lens opening, to which the testing portions are brought in succession; and a shutter for normally excluding actinic light from said opening.

17. A photographic camera including a negative element; and a sensitized testing portion coupled therewith for testing actinic light value, there being an opening in the camera casing distinct from the lens opening and at which the testing portion may be placed to be acted upon by light.

In witness whereof, I hereunto subscribe my name this thirty first day of March, A. D., 1915.

HARRY L. IDE.

Witnesses:
G. L. CRAGG,
E. L. WHITE.